(12) United States Patent
Fickeisen et al.

(10) Patent No.: US 6,169,132 B1
(45) Date of Patent: Jan. 2, 2001

(54) FLOORING ADHESIVES

(75) Inventors: Peter Fickeisen, Dirmstein; Eckehardt Wistuba, Bad Dürkheim, both of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/325,044

(22) Filed: Jun. 3, 1999

(30) Foreign Application Priority Data

Jun. 4, 1998 (DE) .............................. 198 24 928

(51) Int. Cl.⁷ ...................................... C08L 93/04
(52) U.S. Cl. .................... 524/271; 524/270; 524/272; 524/273; 524/274; 524/915
(58) Field of Search .................. 524/270, 271, 524/272, 273, 274, 915

(56) References Cited

U.S. PATENT DOCUMENTS

| | | | | |
|---|---|---|---|---|
| 3,015,638 | * | 1/1962 | Sergi ..................................... | 524/274 |
| 4,590,230 | * | 5/1986 | Kamada et al. ...................... | 524/273 |
| 4,654,388 | * | 3/1987 | Lofgren ................................ | 524/272 |
| 5,196,468 | | 3/1993 | Schwerzel et al. .................. | 524/242 |
| 5,565,511 | * | 10/1996 | Braud et al. ......................... | 524/915 |
| 5,935,312 | * | 8/1999 | Krieger ................................ | 524/270 |
| 5,962,564 | * | 10/1999 | Braud et al. ......................... | 524/274 |

FOREIGN PATENT DOCUMENTS 0 490 191   6/1972   (EP) .
WO 95/21884   8/1995   (WO) .

OTHER PUBLICATIONS

Patent Abstract of Japan, AN 99–406179/35, DE 19801892, Jul. 22, 1999.

\* cited by examiner

*Primary Examiner*—Peter A. Szekely
(74) *Attorney, Agent, or Firm*—Oblon, Spivak, McClelland, Maier & Neustadt, P.C.

(57) ABSTRACT

Aqueous composition comprising from 10 to 35% by weight of a water-dispersed polymer A) having a glass transition temperature Tg of below $-10°$ C.

from 5 to 22% by weight of a resin B) which is liquid at 23° C. and 1 bar, has a glass transition temperature of below $-10°$ C. and in which abietic acid is soluble at 23° C. and 1 bar such that it is possible to obtain solutions of resin B and abietic acid having a weight content of up to 50% by weight of abietic acid from 5 to 22% by weight of a resin C) which is based on abietic acid or on modified abietic acid and has a glass transition temperature of from 0 to 90° C. and from 21 to 80% by weight of a filler D), the percentages by weight being based on the sum of the constituents of the aqueous composition with the exception of water.

9 Claims, No Drawings

FLOORING ADHESIVES

The present invention relates to an aqueous composition comprising
- from 10 to 35% by weight of a water-dispersed polymer A) having a glass transition temperature Tg of below −10° C.
- from 5 to 22% by weight of a resin B) which is liquid at 23° C. and 1 bar, has a glass transition temperature of below −10° C. and in which abietic acid is soluble at 23° C. and 1 bar such that it is possible to obtain solutions of resin B and abietic acid having a weight content of up to 50% by weight of abietic acid
- from 5 to 22% by weight of resin C) which is based in abietic acid or on modified abietic acid and has a glass transition temperature of from 0 to 90° C. and
- from 21 to 80% by weight of a filler D), the percentages by weight being based on the sum of the constituents of the aqueous composition with the exception of water.

The invention additionally relates to the use of said aqueous composition as an adhesive for floor coverings.

Adhesives generally are required to display good adhesion—in other words, to stick well to the substrate—and good cohesion—in other words, to hold together well within the adhesive film. Adhesives for floor coverings are subject to particular requirements. Here, there is a desire in particular for good wet bonding capacity. A good wet bonding capacity means that after a carpet, for example, has been laid on the substrate which is coated with the aqueous dispersion, the carpet can initially still be aligned and its position corrected but that, soon thereafter, a slipproof bond developes whose strength increases as drying progresses.

A good dry gripping capacity means that even after a long period of ventilation a carpet, after having been laid on the substrate, which is then dry, gives a firm, slipproof bond.

A further desired aim is to dispense with volatile organic constituents, such as solvents or plasticizers, in order to avoid subsequent exposure to corresponding emissions.

Flooring adhesives are known already from EP-A-490191 and WO 95/21884 and German Patent Application P 19 801 892.4 (OZ 48 723).

Fundamentally, therefore, there is a desire for adhesives which in the course neither of processing nor of subsequent use emit substances which pollute the air in the room, and which, at the same time, are notable in performance terms for good tackiness, such as good wet bonding and dry gripping capacities, and high thermal stability of the bond.

It is an object of the present invention to provide adhesives, especially flooring adhesives, having the above properties.

We have found that this object is achieved by the aqueous composition defined at the outset and by its use as an adhesive.

The aqueous composition comprises preferably
- from 15 to 30% by weight, with particular preference from 18 to 28% by weight, of the polymer A)
- from 7 to 19% by weight, with particular preference from 9 to 16% by weight, of the resin B)
- from 7 to 19% by weight, with particular preference from 9 to 16% by weight, of the resin C) and
- from 32 to 71% by weight, with particular preference 40–64% by weight, of filler D).

These percentages by weight are based on the sum of the components of the aqueous composition with the exception of water, i.e., essentially the solids content of the formulation.

The solids content of the composition of the invention is preferably 65–92%, especially 76–84% by weight.

The polymer A) is preferably a free-radically polymerized polymer composed of ethylenically unsaturated monomers.

The polymer preferably comprises principal monomers selected from $C_1$–$C_{20}$-alkyl (meth)acrylates, vinyl esters of carboxylic acids having up to 20 carbons, vinylaromatic compounds having up to 20 carbons, ethylenically unsaturated nitriles, vinyl halides, nonaromatic hydrocarbons having at least 2 conjugated double bonds, or mixtures of these monomers.

The abovementioned monomers and monomer mixtures are preferably present in the polymer to an extent of from 60 to 100% by weight, preferably from 80 to 100% by weight and, with particular preference, from 90 to 99.8% by weight, based on the polymer.

Mention may be made specifically, for example, of $C_1$–$C_{12}$-alkyl (meth)acrylates, such as methyl methacrylate, methyl acrylate, n-butyl acrylate, ethyl acrylate and 2-ethylhexyl acrylate.

Mixtures of the (meth)acrylic alkyl esters are also particularly suitable.

Examples of vinyl esters of carboxylic acids having 1 to 20 carbons are vinyl laurate, vinyl stearate, vinyl propionate, vinyl esters of Versatic acid (chemical name: neonanonic acid; formula $C_8H_{17}COOH$), and vinyl acetate.

Suitable vinylaromatic compounds are vinyltoluene, α- and p-methylstyrene, α-butylstyrene, 4-n-butylstyrene, 4-n-decylstyrene and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

As nonaromatic hydrocarbons having 2 to 8 carbons and at least two olefinic double bonds there may be mentioned butadiene, isoprene and chloroprene.

Particular preference is given to (meth)acrylic esters and mixtures thereof.

Further monomers, which may be present, for example, to an extent of from 0 to 40% by weight, preferably from 0 to 20% by weight and, with particular preference, from 0.2 to 10% by weight in the polymer, are, in particular, $C_1$–$C_{10}$-hydroxyalkyl (meth)acrylates, (meth)acrylamide and its derivatives substituted on the nitrogen by $C_1$–$C_4$-alkyl, ethylenically unsaturated carboxylic acids, dicarboxylic acids, their monoesters and anhydrides, examples being (meth)acrylic acid, maleic acid, fumaric acid, maleic anhydride, maleic and fumaric monoesters, and itaconic acid. Very particular preference is given to a content of from 0.2 to 5% by weight of an ethylenically unsaturated carboxylic acid.

The glass transition temperature of the polymer lies preferably between −50 and −10°C., in particular between −40 and −15° C. and, with very particular preference, between −15 and −30° C.

The glass transition temperature of the polymer can be determined by customary methods, such as differential thermal analysis or differential scanning calorimetry (see e.g. ASTM 3418/82, midpoint temperature).

The gel content of the polymer A) is preferably below 40% by weight, more preferably below 30% by weight and, with particular preference, below 20% by weight, based on the polymer A). The gel content should preferably be more than 5% by weight.

The gel content is the content of insoluble constituents. It is determined and defined by the following method: The dispersion is dried at 21° C. to give a film approximately 1 mm thick. One gram of the polymer film is added to 100 ml of tetrahydrofuran and is allowed to stand at 21° C. for a week. Thereafter, the resulting solution or mixture is filtered with the aid of a cloth filter (mesh size 125 $\mu$m). The residue (swollen film) is dried at 21° C. for 2 days in a vacuum drying cabinet and then weighed. The gel content is the mass of the weighed residue divided by the mass of the polymer film employed.

The tetrahydrofuran-soluble fractions of the polymer are, correspondingly, preferably from 60 to 100% by weight, more preferably from 70 to 100% by weight and, with particular preference, from 80 to 100% by weight, in particular up to 95% by weight, based on the polymer.

The number-average molecular weight $M_n$ of these soluble fractions is preferably less than 30,000, in particular less than 20,000 and, more preferably, less than 15,000, and the weight-average molecular weight $M_w$ is preferably more than 250,000 (as determined by gel permeation chromatography with polystyrene as standard on a polymer solution in tetrahydrofuran following sedimentation of the insoluble constituents).

Generally, however, $M_n$ is not less than 5000 g/mol and $M_w$ is not more than 800,000 g/mol.

The polymer is prepared by free-radical polymerization. Suitable methods of polymerization, such as bulk, solution, suspension or emulsion polymerization, are known to the skilled worker.

The copolymer is preferably prepared by solution polymerization with subsequent dispersion in water or, with particular preference, by emulsion polymerization, to give aqueous copolymer dispersions.

The emulsion polymerization can be conducted batchwise, with or without the use of seed latices, with all or some constituents of the reaction mixture being included in the initial charge, or, preferably, with some being included in the initial charge and the remainder of all or some constituents of the reaction mixture being metered in subsequently, or else in accordance with the metering technique without an initial charge.

In the emulsion polymerization, the monomers can as usual be polymerized in the presence of a water-soluble initiator and an emulsifier at preferably from 30 to 95° C.

Examples of suitable initiators are sodium, potassium and ammonium persulfate, tert-butyl hydroperoxides, water-soluble azo compounds, or redox initiators, such as $H_2O_2$/ ascorbic acid.

Examples of emulsifiers which are used are alkali metal salts of relatively long-chain fatty acids, alkyl sulfates, alkylsulfonates, alkylated arylsulfonates or alkylated biphenyl ether sulfonates. Further suitable emulsifiers are reaction products of alkylene oxides, especially ethylene oxide or propylene oxide, with fatty alcohols, fatty acids or phenol, or else with alkylphenols.

In the case of aqueous secondary dispersions the copolymer is first of all prepared by solution polymerization in an organic solvent and is then dispersed in water without the use of an emulsifier or dispersing auxiliary but with the addition of salt-forming agents—for example, ammonia for carboxyl-containing copolymers. The organic solvent can be removed by distillation. The preparation of aqueous secondary dispersions is known to the skilled worker and is described, for example, in DE-A-37 20 860.

In the course of polymerization it is possible to employ regulators to adjust the molecular weight. Suitable examples are SH-containing compounds, such as mercaptoethanol, mercaptopropanol, thiophenol, thioglycerol, ethyl thioglycolate, methyl thioglycolate and tert-dodecyl mercaptan.

The solids content of the resulting polymer dispersions is preferably from 40 to 80% by weight and, with particular preference, from 45 to 75% by weight. High polymer solids contents can be established, for example, by techniques which are described in German Patent Application P 4 307 683.1 or in EP 37 923.

The composition of the invention additionally comprises a liquid resin B) having a glass transition temperature Tg of below $-10°$ C., preferably below $-15°$ C. The resin B) is a solvent for abietic acid. The solubility of abietic acid in resin B) at 23° C. and 1 bar is sufficient to allow the preparation of solutions of resin B) and abietic acid having an abietic acid content of up to 50% by weight, preferably up to 90% by weight (and, correspondingly, a content of resin B) of 50% by weight, preferably 10% by weight), based in each case on the solution.

Suitable resins B) preferably have a number-average molecular weight $M_n$ of from 300 to 3000, with particular preference from 450 to 2800. The molecular weight $M_n$ is determined as already described above.

Examples of suitable resins B) are hydrocarbon resins—that is, resins consisting exclusively of carbon and hydrogen—or modified hydrocarbon resins, which may contain up to 10% by weight, based on the resin, of hydroxyl groups.

Mention may be made of resins comprising unsaturated aromatic hydrocarbons, especially $C_9$ or $C_{10}$ hydrocarbons, such as coumarone, indene, and $\alpha$-methylstyrene. These resins may contain OH groups as a result, for example, of copolymerization or polymer-analogous reactions, examples being addition reactions of phenol, cresol or hydroquinone. Suitable resins have viscosities, for example, of from 200 to 450 mPas (23° C., DIN 53019). A commercially available example is Novares®XK 039 from VFT.

Further suitable resins B) re alkyd resins, or alkyd resins modified with saturated or unsaturated oils. Polyethers, especially polyvinyl ethers, are also suitable. Further suitable resins B) are resins based on abietic acid derivatives, especially esterified abietic acid (trade names: Dertaline® 25 or Burez LE 3004), provided they meet the above conditions.

Further suitable materials in place of resins B) are unsaturated or saturated oils and their derivatives, for example epoxidized oils or opened epoxides.

It is of course also possible to employ combinations of different resins B).

Resins C) are resins based on abietic acid or modified abietic acid, such as on hydrogenated or disproportionated abietic acid, having a glass transition temperature of from 0 to 90° C., preferably from 40 to 85° C. Resins C) are tackifier resins as are commonly employed in the adhesives industry.

Suitable resins C) are known in particular as rosins.

The aqueous composition also includes at least the filler D). Examples of suitable such fillers are finely ground or precipitated chalks having an average particle diameter of in general between 2 and 50 μm, and/or quartz flour having a customary average particle diameter of from 3 to 50 μm.

The composition may also include wetting agents or dispersants, for example, for the fillers; thickeners, and also, for example, further customary additives, such as defoamers and preservatives.

Wetting or dispersing agents can be present in the aqueous composition in amounts, for example, from 0 to 5% by weight, thickeners in amounts from 0 to 10% by weight, preservatives in amounts from 0 to 1% by weight, and defoamers in amounts from 0 to 5% by weight. These amounts by weight relate to the sum of all constituents of the aqueous composition with the exception of water.

The composition is preferably essentially free and with particular preference totally free from organic solvents and plasticizers such as butyl acetate, toluene or phthalates, for example. It therefore comprises organic compounds having a boiling point of below 300° C. at atmospheric pressure (1 bar) in amounts of preferably less than 0.5% by weight, with particular preference less than 0.1% by weight, with very particular preference less than 0.05% by weight and, in particular, less than 0.01% by weight. It is particularly preferred for the composition of the invention or the flooring adhesives of the invention to meet the requirements of freedom from emissions as defined by the Gemeinschaft Emissionskontrollierter Verlegewerkstoffe [German Association for Controlled-Emission Installation Materials; GEV].

The emissions are determined by a chamber test method. The flooring adhesive or composition of the invention is applied at a rate of 300 g/m² to a glass plate whose size depends on the volume of the chamber. The chamber is loaded with 0.4 m² of the coated glass plate per m³ of chamber volume. The emission conditions in the stainless steel testing chamber (volume at least 125 liters) are 23° C., 50% relative atmospheric humidity and an hourly air-change regime which brings about total exchange of the air every 2 hours. The long-term emissions are determined after 10 days. For this purpose, a defined volume of the air stream is passed over adsorbents. Following desorption, the emitted substances are determined by gas (GC-MS coupling) or liquid chromatography. The long-term emissions are determined in μg/m³, using toluene as a standard substance. Emitted substances whose chamber concentration is greater than 20 μg/m³ are identified, and calibration is carried out with the pure substance identified. Emitted substances whose chamber concentration is less than 20 μg/m³ are not identified individually. In these cases, calibration takes place with toluene.

The values for all the substances are added up.

In the case of the composition of the invention, the emission value for the sum of all organic compounds is not more than preferably 1500 μg/m³ and in particular not more than 500 μg/m³.

The preparation of the aqueous composition can take place in a simple manner, for example, by adding the resins B) and C) and the fillers and any further additives with stirring to the aqueous dispersion of the polymer A) that is obtained in the emulsion polymerization.

Preferably, however, the resins B) and C) are not added separately but instead a solution of the resins B) and C) is prepared and this solution is then added to the polymer dispersion.

The preparation of the solution takes place preferably by mixing the resins B) and C) at elevated temperatures. Suitable temperatures, for example, are those up to 180° C., preferably from 60 to 120° C. If desired, it is also possible at the same time to use dispersing auxiliaries, such as emulsifiers or protective colloids.

The water content of the finished aqueous composition (including water) is generally from 7 to 50%, in particular from 10 to 30%, based on the weight of the overall aqueous composition.

The aqueous composition is particularly suitable as an adhesive for bonding substrates made from plastic, wood, metal and textiles formed from woven and/or nonwoven fibers. The aqueous composition is particularly suitable as a flooring adhesive, especially for bonding floor coverings to substrates made from wood, plastic or, in particular, mineral substrates, such as screeding, concrete or ceramic tiles.

The aqueous composition is especially suitable as a flooring adhesive for carpets or other floor coverings made, for example, from PVC (in configurations as multilayer coverings or homogeneous coverings), foam coverings with a textile backing (e.g., jute), polyester nonwoven, rubber coverings, textile coverings with, for example, various backings (such as polyurethane foam, styrene-butadiene foam, or a textile secondary backing), needlefelt floor coverings, polyolefin coverings or linoleum coverings, on substrates such as wood, screeding, concrete, ceramic tiles, metal substrates or the like.

The adhesive can be applied to the substrate using, for example, a toothed applicator. After customary venting, the floor covering is laid. The adhesive composition of the invention features a good level of performance properties such as peel strength, shear strength, wet bonding capacity, dry gripping capacity and thermal stability.

EXAMPLES

I. Aqueous composition

Example 1

The following constituents are mixed. The solution of resin C) (rosin) in resin B) (hydrocarbon resin: Novares XK 039) was prepared beforehand.

|  | parts by weight |
|---|---|
| 62% polyacrylate dispersion (Acronal DS 3518) | 27.5 |
| Resin mixture comprising 50 parts of balsam resin and 50 parts of Novares XK 039 and 5 parts of $C_{12}$-alkyl ethoxylate (10 EO units) | 16.0 |
| $C_{12}$-Alkyl ethoxylate (20 EO) sulfate | 0.5 |
| 3% strength Latekoll D (polyacrylic acid) solution (acrylate thickener) pH 8.5 | 10.8 |
| Silicone-based defoamer | 0.2 |
| $C_{12}$-Alkyl ethoxylate (5 EO) | 0.5 |
| Pigment dispersant NL (sodium salt of polyacrylate) | 0.5 |
| Na gluconate | 1.5 |
| Lumiten ® I-RA (sulfasuccinic acid), wetting agent | 0.2 |
| Ulmer Weiβ XM (calcium carbonate), filler | 42.3 |
|  | 100.0 |

Solids content: 77%

For performance results see Table 1

Comparative Example

|  | parts by weight |
|---|---|
| 62% polyacrylate dispersion (Acronal ® DS 3518) | 27.5 |
| $C_{12}$-Alkyl ethoxylate (10 EO) | 0.5 |
| 2% strength Latekoll D solution pH 8.5 | 11.3 |
| Silicone-based defoamer | 0.2 |
| $C_{12}$-Alkyl ethoxylate (5 EO) | 0.5 |
| Pigment dispersant NL | 0.5 |
| Calgon N (sodium pyrophosphate), 30% strength | 1.0 |
| Na gluconate | 1.5 |
| Lumiten ® I-RA, wetting agent | 0.2 |
| Ulmer Weiβ XM, filler | 45.8 |
|  | 100.0 |

Solids content: 77%

For performance results see Table 1

II. Performance Testing

Wet Bonding Capacity

The adhesive is applied with a DIN blade to a cement fiberboard panel (e.g., Eternit® 2000) (20×50 cm) in the direction of takeoff. The amount applied is about 350–400 g/m². Needlefelt floor covering strips are placed in the bed of adhesive following a venting period of 10 minutes and are pressed on with a 2.5 kg roller by rolling backward and forward 3 times. At the stated intervals of time the strips are pulled off with a takeoff apparatus, during which the increase in the peel resistance is determined in N 5 cm.

Dry Gripping Capacity

The adhesive is applied with a DIN blade to a cement fiberboard panel (e.g., Eternit® 2000) (20×50) in the direction of takeoff. The amount applied is about 250–300 g/m². PVC strips (Pegulang® B 1) are placed in the bed of adhesive following varying venting times and are pressed on with a 2.5 kg roller by rolling backward and forward (3×). Subsequently, the strips are pulled off with a takeoff apparatus and the peel resistance is determined in N 5 cm.

TABLE 1

| Test results | | | | |
|---|---|---|---|---|
| | Wet bonding capacity (N/5 cm) after | | | |
| | 10 min | 15 min | 20 min | 30 min |
| Example 1 | 9 | 15 | 28 | 45 |
| Comparative | 6 | 11 | 17 | 33 |
| | Dry gripping capacity (N/5 cm) after | | | |
| | 10 min | | 20 min | 30 min |
| Example 1 | 2 | | 30 | 27 |
| Comparative | 0 | | 8 | 9 |

We claim:

1. An aqueous composition comprising from 10 to 35% by weight of a water-dispersed polymer A) having a glass transition temperature Tg of below −10° C.

from 5 to 22% by weight of a resin B) which is liquid at 23° C. and 1 bar, has a glass transition temperature of below −10° C. and in which abietic acid is soluble at 23° C. and 1 bar such that it is possible to obtain solutions of resin B and abietic acid having a weight content of up to 50% by weight of abietic acid from 5 to 22% by weight of a resin C) which is based on abietic acid or on modified abietic acid and has a glass transition temperature of from 0 to 90° C. and from 21 to 80% by weight of a filler D), the percentages by weight being based on the sum of the constituents of the aqueous composition with the exception of water.

2. An aqueous composition as claimed in claim 1, wherein the gel content of polymer A) is less than 40% by weight and the number-average molecular weight Mn of the soluble fractions of the polymer is less than 30,000.

3. An aqueous composition as claimed in claim 1, wherein the polymer A) is in the form of an aqueous dispersion with a solids content of from 40 to 75% by weight.

4. An aqueous composition as claimed in claim 1, wherein the content of volatile organic constituents—that is, organic compounds having a boiling point at 1 bar of less than 300° C.—is less than 0.5% by weight, based on the aqueous composition.

5. An aqueous composition as claimed in claim 1, wherein the polymer A) consists to the extent of from 60 to 100% by weight of principal monomers selected from the group consisting of $C_1$–$C_{20}$-alkyl (meth)acrylates, vinyl esters of carboxylic acids having up to 20 carbons, vinylaromatic compounds having up to 20 carbons, ethylenically unsaturated nitriles, vinyl halides, nonaromatic hydrocarbons having at least 2 conjugated double bonds, and mixtures of these monomers.

6. An aqueous composition as claimed in claim 1, obtainable by first preparing a solution of the resins B) and C) and then adding this solution and the other constituents of the composition to the aqueous dispersion of the polymer A).

7. A process for preparing an aqueous composition as claimed in claim 1, which comprises first preparing a solution of the resins B) and C) and then adding this solution and the other constituents of the composition to the aqueous dispersion of the polymer A).

8. The process of forming an adhesive, comprising forming an aqueous dispersion containing the composition of claim 1.

9. The process of forming a flooring adhesive, comprising forming an aqueous dispersion containing the composition of claim 1.

* * * * *